United States Patent [19]

Miyazaki et al.

[11] Patent Number: 5,369,178
[45] Date of Patent: Nov. 29, 1994

[54] RESIN COMPOSITION FOR THERMOSETTING COATING

[75] Inventors: Eiichiro Miyazaki, Fujisawa; Taisaku Kano, Yokohama, both of Japan

[73] Assignee: Mitsui Toatsu Chemicals, Inc., Tokyo, Japan

[21] Appl. No.: 907,176

[22] Filed: Jul. 1, 1992

[30] Foreign Application Priority Data

Jul. 5, 1991 [JP] Japan .................. 3-165529
Nov. 8, 1991 [JP] Japan .................. 3-293087
Nov. 8, 1991 [JP] Japan .................. 3-293088
Nov. 8, 1991 [JP] Japan .................. 3-293089

[51] Int. Cl.$^5$ .................. C08L 33/02; C08L 33/06
[52] U.S. Cl. .................. 525/155; 525/208; 525/221; 525/227; 525/519; 525/194; 427/407.1
[58] Field of Search .............. 525/208, 221, 227, 155, 525/519, 194

[56] References Cited

U.S. PATENT DOCUMENTS

| | | | |
|---|---|---|---|
| 4,564,646 | 1/1986 | Nishigaki et al. ............ | 522/13 |
| 4,650,718 | 3/1987 | Simpson et al. . | |
| 4,681,811 | 7/1987 | Simpson et al. . | |
| 4,688,054 | 8/1987 | Inamoto et al. .............. | 346/140 |
| 4,703,101 | 10/1987 | Singer et al. . | |
| 4,764,430 | 8/1988 | Blackburn et al. . | |
| 5,164,442 | 11/1992 | Itoh et al. .................... | 524/492 |

FOREIGN PATENT DOCUMENTS

158161 10/1985 European Pat. Off. .
1-139653 6/1989 Japan .

OTHER PUBLICATIONS

Chemical Abstracts, vol. 117, No. 4, Jul. 26, 1992.
Chemical Abstracts, vol. 115, No. 26, Dec. 30, 1991.
Chemical Abstracts, vol. 113, No. 22, Nov. 26, 1990.
Chemical Abstracts, vol. 113, No. 4, Jul. 23, 1990.

*Primary Examiner*—James J. Seidleck
*Assistant Examiner*—Mary Critharis
*Attorney, Agent, or Firm*—Burns, Doane, Swecker & Mathis

[57] ABSTRACT

A resin composition for thermosetting coating, which comprises ($a_1$) an acrylic copolymer having a particular acid value and/or ($a_2$) an acrylic copolymer having a particular acid value and a particular hydroxyl value, (b) an acrylic copolymer having a particular epoxy equivalent, (c) a monobasic acid having a dissociation constant (pKa) of 3 or less, and, as necessary, (d) an amino resin and (e) a quaternary phosphoium salt, and wherein the equivalent ratio of the acid groups of ($a_1$) and/or ($a_2$) and the epoxy groups of (b) is 1:0.5 to 0.5:1 and the amounts of (c), (d) and (e) are 0.01–5 parts by weight, 1–25 parts by weight and 0.01–3 parts by weight, respectively, per 100 parts by weight of the total of ($a_1$) and/or ($a_2$) and (b).

The resin composition, when used as a clear coating for automobiles, is superior in film appearance, acid resistance, solvent resistance water resistance, weatherability, storage stability and low temperature curing.

33 Claims, No Drawings

大,369,178

RESIN COMPOSITION FOR THERMOSETTING COATING

BACKGROUND OF THE INVENTION (a) Field of the Invention

The present invention rates to a thermosetting resin composition which is used as a clear coating to be coated as a top coating on a base coating by a wet-on-wet coating method.

More particularly, the present invention relates to a coating resin composition superior in acid resistance, storage stability, low temperature curing, film appearance, weatherability, etc., which is suitably used as a clear coating composition in a coating system for automobile bodies wherein a base coating containing a color pigment and a metallic pigment is coated on a substrate, a clear top coating is coated thereon by a wet-on-wet coating method, and simultaneously baking is conducted.

(b) Description of the Prior Art

In recent years, characteristics such as high-quality appearance, excellent durability and the like have been required for coatings used for coating of automobile body. In order to satisfy these requirements, a two-coating method is in wide use wherein a clear coating is applied on a base coating.

As the clear coating, acrylic melamine resin type thermosetting coatings of solvent type are in wide use.

Acrylic melamine resin type coatings, however, have no sufficient resistance to acid rain, give rise to blistering, hazing, rain-induced staining, etc., and have no sufficient durability.

In order to solve-these problems, the present applicant proposed a thermosetting solvent type coating composition which utilizes a curing reaction between carboxylic acid group and epoxy group, in Japanese Patent Application Kokai (Laid-Open) No. 139653/1989.

In the above thermosetting solvent type coating composition, problems of acid rain resistance, durability, appearance, etc. were eliminated; however, there occurs viscosity increase during the storage, and the storage stability is poor.

Coating compositions which utilize a curing reaction between acid group and epoxy group, are also described in U.S. Pat. Nos. 4650718, 4681811, 4703101 and 4764430. These compositions generally have poor Storage stability because the curing reaction proceeds even at room temperature, and actually are handled as a two-pack type and the mixing of two packs is conducted right before the use in coating. Thus, the compositions have had serious problems for use in the body coating line of automobile production, as described below.

That is, in the body coating line of automobile production, coatings are generally stored in tanks controlled at a suitable temperature and are made up as they are consumed. The residence time in tank is ordinarily about one month.

In automobile plants, the production lines are often stopped for various reasons. If the stopping makes the above residence time longer, there occurs a viscosity increase of the coating in tanks or pipes as well as gelation in pipes. If such troubles happen, much time and labor are required for the cleaning of tanks and pipes, which may cause serious damage. Particularly when gelation in pipes occurs, not a few days are required until the restart of production, in some cases.

OBJECTS AND SUMMARY OF THE INVENTION

In view of the above situation, a first object of the present invention is to provide a resin composition for a thermosetting coating, which coating gives rise to no viscosity increase during storage and which coating has excellent storage stability.

Another object of the present invention is to provide a resin composition for a thermosetting coating, which coating can be sufficiently set even at relatively low baking temperatures (in the baking of coating applied onto automobile bodies some areas of the body cannot be heated to an intended temperature level owing to the complexity of the body structure and, at such areas, baking is inevitably conducted at low temperatures such as about 120° C.).

The present inventors conducted studies on the improvement of the conventional clear top coating composition applied on a base coating by a wet-on-wet coating method and found that by adding, to the conventional thermosetting solvent type coating composition consisting mainly of an acrylic copolymer and utilizing a curing reaction between carboxylic acid group and epoxy group, a monobasic acid having a dissociation constant (pKa) of 3 or less and, as necessary, an amino resin and/or a quaternary phosphonium salt in particular amounts, there can be obtained a resin composition for a thermosetting coating which, as compared with conventional coatings containing a carboxylic acid group and an epoxy group, has far higher storage stability (specifically explaining, the curing reaction between carboxylic acid group and epoxy group is suppressed at room temperature and the application to a body coating line of automobile production is possible and has no problem even at an elevated temperature of 40° C.), which shows improved low temperaturing curing, and which has sufficient acid rain resistance, weatherability and film appearance. The above finding has led to the completion of the present invention.

According to a first aspect of the present invention, there is provided a resin composition for a thermosetting coating, which comprises ($a_1$) an acrylic copolymer containing a carboxylic acid group-containing monomer and another monomer copolymerizable therewith, said acrylic copolymer having an acid value of 30–150 mgKOH/g, (b) an acrylic copolymer containing an epoxy group-containing monomer and another monomer copolymerizable therewith, said acrylic copolymer having an epoxy equivalent of 200–1,000 g/eq, and (c) a monobasic acid having a dissociation constant (pKa) of 3 or less, and wherein the equivalent ratio of the carboxylic acid groups of ($a_1$) and the epoxy groups of (b) is 1:0.5 to 0.5:1 and the amount of (c) is 0.01–5 parts by weight per 100 parts by weight of the total of ($a_1$) and (b).

According to a second aspect of the present invention, there is provided a resin composition according to claim 1, which comprises ($a_2$) an acrylic copolymer containing a carboxylic acid group-containing monomer, a hydroxyl group-containing monomer and another monomer copolymerizable therewith, said acrylic copolymer having an acid value of 30–150 mgKOH/g and a hydroxyl value of 5–100 mgKOH/g, (b) an acrylic copolymer containing an epoxy group-containing monomer and another monomer copolymerizable therewith, said acrylic copolymer having an epoxy equivalent of 200–1,000 g/eq, (c) a monobasic acid having a dissociation constant (pKa) of 3 or less, and (d) an amino resin, and wherein the equivalent ratio of the carboxylic acid groups of ($a_2$) and the epoxy groups of (b) is 1:0.5 to 0.5:1, the amount of (c) is 0.01–5 parts by weight per 100 parts by weight of the total of ($a_2$) and (b), and the amount of (d) is 1–25 parts by weight per 100 parts by weight of the total of ($a_2$) and (b).

According to a third aspect of the present invention, there is provided a resin composition for a thermosetting coating, which comprises, in addition to the above ($a_1$) and/or ($a_2$), (b) and (c), (e) a quaternary phosphonium salt in an amount of 0.01–3 parts by weight per 100 parts by weight of the total of ($a_1$) and/or ($a_2$) and (b).

According to a fourth aspect of the present invention, there is provided a resin composition for thermosetting coating, which comprises, in addition to the above ($a_1$) and/or ($a_2$), (b) and (c), (d) an amino resin and (e) a quaternary ammonium salt in amounts of 1–25 parts by weight and 0.01–3 parts by weight, respectively, per 100 parts by weight of the total of ($a_1$) and/or ($a_2$) and (b).

DETAILED DESCRIPTION OF THE INVENTION

In the present invention, as the carboxylic acid group-containing monomer used in the acrylic copolymers ($a_1$) and ($a_2$), there are mentioned acrylic acid, methacrylic acid, maleic acid, maleic anhydride, itaconic acid and their monoesters. These monomers can be used singly or in combinations of two or more.

Of these monomers, acrylic acid, methacrylic acid and their mixture are particularly preferable.

As the hydroxyl group-containing monomer, there are mentioned hydroxyethyl (meth)acrylate, hydroxypropyl (meth)acrylate, 2-hydroxybutyl (meth)acrylate, 4-hydroxybutyl (meth)acrylate, ε-caprolactone adduct of hydroxyethyl (meth)acrylate, ethylene oxide or propylene oxide adduct of hydroxyethyl (meth)acrylate, etc. These monomers can be used singly or in combinations of two or more.

As the copolymerizable monomer, there can be mentioned acrylic acid or methacrylic acid esters such as methyl (meth)acrylate, ethyl (meth)acrylate, propyl (meth)acrylate, n-butyl (meth)acrylate, isobutyl (meth)acrylate, tert-butyl (meth)acrylate, 2-ethylhexyl (meth)acrylate, stearyl (meth)acrylate, tridecyl (meth)acrylate, cyclohexyl (meth)acrylate, benzyl (meth)acrylate, phenyl (meth)acrylate, dimethylaminoethyl (meth)acrylate, diethylaxeinoethyl (meth)acrylate and the like. Incidentally, the (meth)acrylate refers to acrylate and methacrylate.

As the copolymerizable monomer, there are also mentioned styrene, α-methylstyrene, vinyltoluene, acrylonitrile, methacrylonitrile, vinyl acetate, vinyl propionate, acrylamide, methacrylamide, methylolacrylamide, methylolmethacrylamide, vinyl chloride, propylene, ethylene, $C_{4-20}$ α-olefins, etc.

In the present invention, a copolymer containing therein an acrylic acid or methacrylic acid ester monomer is called "acrylic copolymer".

Appropriately, the carboxylic acid group-containing monomer is contained in the acrylic copolymers ($a_1$) and ($a_2$) in such an amount that the acrylic copolymer ($a_1$) or ($a_2$) has an acid value of 30–150 mgKOH/g. When the acid value is less than 30 mgKOH/g, the resulting resin composition shows insufficient curing, therefore it has poor solvent resistance. When the acid value is more than 150 mgKOH/g, the resin composition has poor solubility in solvents and generates a precipitate, making the stability poor and giving a solvent type coating of no practical applicability. The acid value is preferably in the range of 50–120 mgKOH/g. Incidentally, the acid value is the amount (mg) of KOH required for neutralization of 1 g of the acrylic copolymer, and its unit is mgKOH/g.

The hydroxyl value of the acrylic copolymer ($a_2$) is appropriately 5–100 mgKOH/g. When the hydroxyl value is smaller han 5, the crosslinking reaction between acrylic copolymer and amino resin is insufficient. Incidentally, the hydroxyl value is the amount (mg) of KOH required for neutralization of 1 g of the acrylic copolymer, and its unit is mgKOH/g.

The number-average molecular weight is a value obtained by GPC using polystyrene as a standard, and its appropriate range is 3,500–20,000.

When the number-average molecular weight is less than 3,500, the resulting resin composition has poor solvent resistance, is easily scratched by brushing in car washing, etc., has poor water resistance and is inferior in durability necessary for retaining good film quality. Further, with such a molecular weight, there occurs mixing between clear coating and base coating, giving rise to reduction in gloss and consequently reduction in film appearance. When the number-average molecular weight is more than 20,000, the resulting resin composition has a low non-volatile content and gives poor film appearance. The number-average molecular weight is preferably in the range of 5,200–20,000.

The glass transition temperatures of the acrylic copolymers ($a_1$) and ($a_2$) are preferably 50° C. or below, more preferably −20° C. to 40° C.

The acrylic copolymers ($a_1$) and ($a_2$) may be used together.

The carboxylic acid group-containing copolymer must be an acrylic copolymer. If another polymer, for example, a carboxylic acid group-containing polyester resin is used in place of the acrylic copolymer ($a_1$) or ($a_2$), the resulting composition has poor acid resistance and generates staining induced by acid rain, and is therefore not suitable for practical applications.

The acrylic copolymers ($a_1$) and ($a_2$) can be synthesized by a conventional process and can be produced by any known polymerization process such as solution polymerization process, suspension polymerization process, bulk polymerization process, emulsion polymerization process or the like.

In the polymerization, there can be used a polymerization initiator such as azobisisobutyronitrile, 4,4'-azobis(4-cyanopentanoic acid), benzoyl peroxide, tert-butyl peroxy-2-ethylhexanoate, cumene hydroperoxide, potassium persulfate, hydrogen peroxide, 2,2'-azobis[2-methyl-N-(2-hydroxyethyl)propionamide] or the like. As necessary, there can be used a chain transfer agent such as dodecylmercaptan, mercaptoethanol, α-methylstyrene dimer or the like.

In the present invention, as the epoxy group-containing monomer used in the acrylic copolymer (b), there are mentioned, for example, glycidyl methacrylate, glycidyl acrylate, methylglycidyl methacrylate, methylglycidyl acrylate and allyl glycidyl ether. These monomers can be used singly or in conbinations of two or more.

As the monomer copolymerizable with the epoxy group-containing monomer, there can be used all the copolymerizable monomers mentioned with respect to the acrylic copolymers ($a_1$) and ($a_2$).

Similar to the acrylic copolymers ($a_1$) and ($a_2$), the acrylic copolymer (b) can be synthesized according to an ordinary process, and can be produced by the same polymerization process as for the acrylic copolymers ($a_1$) and ($a_2$), using a polymerization initiator and, as necessary, a chain transfer agent.

The epoxy group-containing monomer is used in the acrylic copolymer (b) appropriately in such an amount that the acrylic copolymer (b) has an epoxy equivalent of 200–1,000 g/eq. When the epoxy equivalent is more than 1,000 g/eq, the resulting resin composition shows insufficient curing and has poor solvent resistance. When the epoxy equivalent is less than 200 g/eq, the resin composition is unable to give a coating film having a smooth surface, i.e. a coating film of desired quality. Incidentally, the epoxy equivalent is a resin weight (g) per g of epoxy group, and its unit is g/eq.

The appropriate number-average molecular weight of the acrylic copolymer (b) is in the range of 500–5,000. When the number-average molecular weight is less than 500, the resulting resin composition has increased reactivity but has low durability, which often makes it difficult to obtain a desired coating film. When the molecular weight is more than 5,000, the curing reaction of the acrylic copolymer (b) with the acrylic copolymer ($a_1$) and/or ($a_2$) does not proceed sufficiently during baking, giving a coating film of poor solvent resistance.

The reason for this insufficient curing reaction is presumed to be that the curing reaction is a crosslinking reaction between the acrylic copolymer ($a_1$) and/or ($a_2$) and the acrylic copolymer (b). That is, when the number-average molecular weight of the acrylic copolymer (b) is as large as more than 5,000, the resin composition increases its viscosity rapidly at the early stage of crosslinking reaction, which reduces the reactivity between the acid groups and epoxy groups in the later crosslinking reaction.

The number-average molecular weight of the acrylic copolymer (b) is preferably smaller than those of the acrylic copolymers ($a_1$) and ($a_2$). The acrylic copolymer (b) acts as a curing agent for the acrylic copolymers ($a_1$) and ($a_2$).

The glass transition temperature of the acrylic copolymer (b) is appropriately 50° C. or less, preferably −20° C. to 40° C.

In preparing the present resin composition, it is necessary that the acrylic copolymer ($a_1$) and/or ($a_2$) and the acrylic copolymer (b) be used so as to give an equivalent ratio of carboxylic acid groups and epoxy groups, of 1:0.5 to 0.5:1. When the equivalent ratio is outside this range, the resulting resin composition gives a coating film of poor solvent resistance and water resistance.

In the present invention, as the monobasic acid (c) having a dissociation constant (pKa) of 3 or less, there are mentioned organic sulfonic acids, other organic acids and inorganic acids.

The dissociation constant (pKa) of the monobasic acid (c) is 3 or less. When the dissociation constant (pKa) is more than 3, the resulting resin composition has poor storage stability. The use of a dibasic acid in place of the monobasic acid gives no storage stability as obtained when the monobasic acid is used.

The monobasic acid (c) is exemplified by p-toluenesulfonic acid, dodecylbenzenesulfonic acid, dinonylnaphthalenesulfonic acid, methanesulfonic acid, trichloroacetic acid, thioacetic acid, acidic phosphoric acid esters (e.g. methyl acid phosphate), hydrochloric acid and nitric acid. As the monobasic acid (c), there can also be used organic sulfonic acids blocked with an amine or the like. These acid catalysts can be used singly or in combination of two or more.

The preferable monobasic acid is an organic acid in view of solubility. The monobasic acid which is most preferable in view of the storage stability, is a monobasic acid having a dissociation constant (pKa) of 1 or less. Incidentally, the dissociation constant (pKa) is defined as a value at 25° C.

In the present resin composition, the appropriate amount of the monobasic acid (c) having a dissociation constant (pKa) of 3 or less, is 0.01–5 parts by weight, preferably 0.3–4.0 parts by weight per 100 parts by weight of the total of the acrylic copolymer ($a_1$) and/or ($a_2$) and the acrylic coolymer (b). When the amount of (c) is less than 0.01 part by weight, the resulting resin composition has poor storage stability and is not suitable for practical application. When the amount is more than 5 parts by weight, the resin composition gives a coating film of poor water resistance.

With respect to the storage stability of a coating, the coating has no practical applicability and is generally regarded to have poor storage stability when the coating shows, under the storage condition of 40° C., a viscosity increase of, for example, from 30 sec (25° C.) to 50 sec (25° C.) in ten days or less as measured using Ford Cup #4.

The amino resin (d) which is used as necessary in the present resin composition for thermosetting coating, is a resin which is synthesized from formaldehyde and at least one compound selected from melamine, urea, benzoguanamine, glycoluril, etc. and whose methylol group is partially or wholly alkyl-etherified with a lower alcohol such as methanol, ethanol, propanol, isopropanol, butanol, isobutanol or the like.

In the present invention, the appropriate amount of the amino resin (d) used is 1–25 parts by weight per 100 parts by weight of the total of the acrylic copolymer ($a_1$) and/or ($a_2$) and the acrylic copolymer (b). When the amount is more than 25 parts by weight, the resulting resin composition has poor acid resistance.

The quaternary phosphonium salt (e) which can be used as necessary in the present resin composition for thermosetting coating, is exemplified by methyltrioctylphosphonium dimethylphosphate, methyltributylphosphonium dimethylphosphate, methyltriphenylphosphonium dimethylphosphate, tetrabutylphosphonium acetate, benzyltriphenylphosphonium acetate, tetrabutylphosphonium bromide, tetrabutylphosphonium chloride, tetrabutylphosphonium iodide, tetraphenylphosphonium bromide, tetraphenylphosphonium chloride, tetraphenylphosphonium iodide, benzyltriphenylphosphonium bromide, benzyltriphenylphosphonium chloride, benzyltriphenylphosphonium iodide, tetrabutylphosphonium hydroxide, tetraphenylphosphonium tetraphenylborate and p-styryldiphenylphosphonium bromide; a polymer of p-styryldiphenylphosphonium bromide; and copolymers between p-styryldiphenylphosphonium bromide and other monomers copolSanerizable therewith. These quaternary phosphonium salts can be used singly or in combinations of two or more. The quaternary phosphoniuum salt (e) acts as a catalyst for a curing reaction between carboxylic acid groups and epoxy groups.

The quaternary phosphonium salt (e) may be used together with a quaternary ammonium salt, a tertiary amine, an organometallic compound, a metal salt of an organic acid, an imidazole or/and a boric acid ester.

In the present invention, the appropriate amount of the quaternary phosphonium salt (e) used is 0.01–3 parts by weight per 100 parts by weight of the total of the acrylic copolymer ($a_1$) and/or ($a_2$) and the acrylic copolymer (b).

When the amount of the quaternary phosphonium salt (e) is less than 0.01 part by weight, the resulting resin composition has poor solvent resistance and water resistance when the baking temperature is as low as about 120° C. When the amount is more than 3 parts by weight, the resin composition has poor storage stability, shows viscosity increase under storage and is not suitable for practical applications.

The solvent usable in the present resin composition for thermosetting coating is exemplified by aliphatic hydrocarbons such as hexane, heptane and the like; aromatic hydrocarbons such as toluene, xylene and the like; petroleum fractions of different boiling point ranges each composed mainly of aromatic hydrocarbons but containing small amounts of aliphatic hydrocarbons; esters such as ethyl acetate, butyl acetate, ethylene glycol diacetate, 2-ethoxyethyl acetate and the like; ketones such as acetone, methyl isobutyl ketone and the like; and alcohols such as methyl alcohol, butyl alcohol and the like. The solvent preferably contains aliphatic hydrocarbon(s) and/or aromatic hydrocarbon(s) in a total amount of 50% by weight or more.

The present resin composition for thermosetting coating can be prepared by compounding, according to a conventional method, an acrylic copolymer ($a_1$) and/or an acrylic copolymer ($a_2$) and an acrylic copolymer (b) so that the equivalent ratio of the carboxylic acid groups of ($a_1$) and/or ($a_2$) and the epoxy groups of (b) becomes 1:0.5 to 0.5:1, a monobasic acid (c) having a dissociation constant (pKa) of 3 or less in an amount of 0.01–5 parts by weight per 100 parts by weight of the total of ($a_1$) and/or ($a_2$) and (b), and, as necessary, an amino resin (d) in an amount of 1–25 parts by weight per 100 parts by weight of the total of ($a_1$) and/or ($a_2$) and (b) and a quaternary phosphonium salt (e) in an amount of 0.01–3 parts by weight per 100 parts by weight of the total of ($a_1$) and/or ($a_2$) and (b).

The present resin composition for thermosetting coating may further contain, as necessary, other components used conventionally, for example, a viscosity-controlling agent (e.g. organic montmorillonite, microgel, polyamide, polyethylene wax), a flow-controlling agent (e.g. silicone, acrylic polymer), an ultraviolet absorber, a curing agent (e.g. blocked isocyanate resin) and a reaction catalyst (e.g. quaternary ammonium salt, tertiary amine, organometallic compound, metal salt of organic acid, imidazole, boric acid ester).

The present resin composition for clear coating may be colored with a small amount of a pigment in such an extent that the clearness of the present composition is not completely opacified with the pigment.

The clear coating composition obtained above is diluted to a desired viscosity with an appropriate solvent. The solvent preferably contains aromatic hydrocarbon(s) and aliphatic hydrocarbon(s) in a total amount of 50% by weight or more.

As the base coating composition onto which the present clear coating composition can be applied, there can be used any base coating composition which can be used for the coating of automobiles. The base coating composition contains a resin and pigments as a coloring agent. As the useful resin composition, there are mentioned an acrylic-melamine type, a polyester alkyd-melamine type, a waterborne acrylic-melamine type, an acrylic polyol or polyesterpolyol-polyisocyanate type, an acrylic emulsion, an acrylic lacquer, etc. The present clear coating resin may be used as the base coating resin composition.

As the metal pigment and color pigment used in the base coating composition, there are mentioned, for example, alumium flakes, copper bronze flakes and mica.

As the color pigment, there are mentioned, for example, inorganic pigments such as titanlush dioxide, iron oxide, chromium oxide, lead chromate and carbon black, as well as organic pigments such as Phthalocyanine Blue and Phthalocyanine Green.

The base coating composition may further contain conventional additives such as surfactant, flow-controlling agent, thixotropic agent, microgel, ultraviolet absorber, catalyst and the like. The composition may further contain a cellulose type resin.

The clear coating composition of the present invention can be applied on a base coating composition by the following typical wet-on-wet coating method.

A base coating composition is coated on a substrate and subjected to flashing, after which a clear coating composition is coated thereon. The flashing is conducted by allowing the coated substrate to stand at room temperature for 1–10 minutes; or, heating of about 80° C. may be added. After the substrate has been coated with the base coating composition and the clear coating composition, the resulting material is subjected to setting for about 5–20 minutes. Thereafter, the material is subjected to baking at about 100°–180° C., preferably 130°–160° C. for about 10–60 minutes. The thickness of the clear film is generally 20–60 $\mu$.

As the method for coating the clear coating composition, there can be used an ordinary method such as brush coating, spray coating, dip coating or the like. Spray coating is preferred because it gives a coating film of excellent appearance. Spray coating includes, for example, an air spraying method and an electrostatic spraying method.

The present invention is hereinafter described more specifically by way of Examples and Comparative Examples. However, the present invention is by no means restricted to these Examples.

In the following description, parts and % are by weight unless otherwise specified.

[Production of carboxylic acid group-containing acrylic copolymers ($a_1$-1) to ($a_1$-7)]

Reference Example 1

A four-necked flask fitted with a stirrer, a thermometer, a reflux condesner and a nitrogen inlet tube was purged with nitrogen. Into the flask were fed 85 parts of Solvesso 100 (an aromatic hydrocarbon having a boiling point of 150°–177° C., a product of ESSO Standard Sekiyu K. K.) and 15 parts of n-butanol. The mixture was heated to 100° C. Thereto were dropwise added the 5 raw materials shown in Table 1, in 5 hours. Then, the mixture was kept at 100° C. for 6 hours to obtain carboxylic acid group-containing acrylic copolymers ($a_1$-1) to ($a_1$-7) each having a solids content of about 50%.

TABLE I

| Raw materials | Acrylic copolymer ($a_1$) | | | | | | |
|---|---|---|---|---|---|---|---|
| | ($a_1$-1) | ($a_1$-2) | ($a_1$-3) | ($a_1$-4) | ($a_1$-5) | ($a_1$-6) | ($a_1$-7) |
| Methyl methacrylate | 5 | | | 5 | 5 | 5 | 5 |
| n-Butyl methacrylate | 35 | 30 | 62 | 65 | 30 | 47 | 15 |
| Isobutyl methacrylate | 25 | 24 | | 21 | 30 | 30 | 30 |
| 2-Ethylhexyl acrylate | 20 | | 25 | | 20 | 15 | 25 |
| Lauryl methacrylate | | 25 | | | | | |
| Styrene | 5 | 5 | 5 | | 5 | | 5 |
| Methacrylic acid | | 6 | 8 | | | | |
| Acrylic acid | 10 | 10 | | 9 | 10 | 3 | 20 |
| N,N'-Azobisisobutyronitrile (polymerization initiator) | 3 | 4 | 1 | 3.7 | 4 | 3.2 | 2.8 |
| n-Dodecylmercaptan (chain transfer agent) | | | | | 1 | | |
| Acid value (of solid) | 78 | 117 | 52 | 70 | 78 | 23 | 156 |
| Glass transition temp. (°C.) | 22.2 | 14.3 | 10.4 | 36.4 | 23.7 | 20.4 | 25.6 |
| Number-average molecular weight | 5800 | 4800 | 15000 | 5500 | 3300 | 5700 | 6000 |

[Production of epoxy group-containing acrylic copolymers (b-1) to (b-7)]

Reference Example 2

The same reactor as used in Reference Example 1 was purged with nitrogen. Thereinto was fed 150 parts of Solvesso 100 (an aromatic hydrocarbon having a boiling point of 150°–177° C., a product of ESSO Standard Sekiyu K. K.). The mixture was heated to 140° C. Thereto were dropwise added the raw materials shown in Table 2, in 5 hours. Then, the mixture was kept at 100° C. for 6 hours, after which 50 parts of Solvesso 100 was distilled off under vacuum ($\leq$30 mmHg) to obtain epoxy group-containing acrylic copolymers (b-1) to (b-7) each having a solids content of about 50%.

TABLE 2

| Raw materials | Acrylic copolymer (b) | | | | | | |
|---|---|---|---|---|---|---|---|
| | (b-1) | (b-2) | (b-3) | (b-4) | (b-5) | (b-6) | (b-7) |
| Methyl methacrylate | | | | 5 | | | 5 |
| n-Butyl methacrylate | 5 | 31 | 27 | 26 | 22 | 2 | 32 |
| Isobutyl methacrylate | | | | 5 | 10 | | 10 |
| 2-Ethylhexyl acrylate | 23 | | 30 | 20 | 20 | 9 | 20 |
| Styrene | 25 | 5 | 25 | 20 | 20 | 10 | 20 |
| Glycidyl methacrylate | 47 | 64 | 18 | 24 | 28 | 79 | 13 |
| N,N'-Azobisisobutyronitrile (polymerization initiator) | 4 | 4 | 3 | 2.5 | 2 | 3.5 | 3.5 |
| n-Dodecylmercaptan (chain transfer agent) | | 2 | | | | | |
| Epoxy equivalent (of solid) | 302 | 222 | 789 | 592 | 507 | 177 | 1092 |
| Glass transition temp. (°C.) | 24.1 | 37.0 | 12.1 | 23.8 | 22.9 | 34.5 | 23.2 |
| Number-average molecular weight | 1500 | 1000 | 2800 | 4800 | 7000 | 2000 | 2000 |

[3-1 Preparation of base coatings]

Reference Example 3

(3-1-1 Preparation of metallic base coating)

100 parts of xylol was fed into a four-necked flask fitted with a stirrer, a thermometer and a condenser, and heated to 100° C. Thereto was dropwise added, in 4 hours, a mixture consisting of 10 parts of styrene, 10 parts of methyl methacrylate, 30 parts of butyl acrylate, 35 parts of isobutyl acrylate, 12 parts of 2-hydroxyethyl methacrylate, 3 parts of methacrylic acid and 2 parts of azobisisobutyronitrile. The mixture was kept at 100° C. for 6 hours to obtain an acrylic resin having a solid content of about 50%.

There were mixed 180 parts of the acrylic resin, 37.5 parts of UVAN 20SE-60 (a butylated melamine resin having a solids content of 60%, a product of Mitsui Toatsu Chemicals, Inc.) and 16.8 parts of Alpaste 7160N (an aluminum flake paste of TOYO ALUMINIUM K. K.) to obtain a base coating composition.

(3-1-2 Preparation of metallic base coating)

The following materials were formulated in the following proportions and mixed using a stirrer, to obtain a base coating composition.

| | |
|---|---|
| Acrylic copolymer ($a_1$-3) produced in Reference Example 1 | 107 parts |
| Acrylic copolymer (b-1) produced in Reference Example 2 | 30 parts |
| Alpaste 7160N | 10.3 parts |

The base coating compositions obtained in the above (3-1-1) and (3-1-2) were diluted with the following mixed solvent to a viscosity of 13 seconds at 25° C. (Ford Cup #4) to obtain metallic base coatings.

| | |
|---|---|
| Ethyl acetate | 15 parts |
| Toluene | 40 parts |
| Solvesso 100 | 35 parts |
| Cellosolve acetate | 10 parts |

[3-2 Preparation of solid color base coating]

The following materials were formulated in the following proportions.

| | |
|---|---|
| Acrylic resin (solids content = 50%) synthesized in (3-1-1) | 60.7 parts |
| Titanium Oxide CR-90 (a product of ISHIHARA SANGYO KAISHA, LTD.) | 52 parts |

The mixture was stirred using a paint shaker for 1 hour to allow the pigment to be dispersed in the resin. Then, 21.7 parts of UVAN 20SE-60 was added. The mixture was diluted with the following mixed solvent to a viscosity of 13 seconds at 25° C. (Ford Cup #4) to obtain a solid color base coating.

| | |
|---|---|
| Toluene | 60 parts |
| Solvesso 100 | 30 parts |
| n-Butanol | 10 parts |

[Preparation of clear coatings]

Reference Example 4

The raw materials shown in Table 3 were formulated in the proportions shown in Table 3. Thereto was added 0.2% by weight of Resimix RL-4 (a flow-controlling agent, a product of Mitsui Toatsu Chemicals, Inc.), and the mixture was stirred using a stirrer. The resulting mixture was diluted with a mixed solvent consisting of 50 parts of Solvesso 100 and 50 parts of Solvesso 150 (both are products of ESSO Standard Sekiyu K. K.) to a viscosity of 30 seconds at 25° C. (Ford Cup #4) to obtain clear coatings.

Example 1

The acrylic copolymer ($a_1$-1), the acrylic copolymer (b-1) and dodecylbenzenesulfonic acid (as a specific monobasic acid) were formulated in the proportions shown in Table 3 and then subjected to the procedure shown in Reference Example 4 to prepare a clear coating.

A cationic electrocoating was coated on a steel plate for automobile body and baked. Thereon was coated, by air spraying, the metallic base coating prepared in (3-1-1) of Reference Example 3, followed by setting for 3 minutes. Thereon was coated the above prepared clear coating by a wet-on-wet coating method, followed by setting for 10 minutes.

The resulting plate was baked at 140° C. for 20 minutes to obtain a test plate. The clear film thickness and film properties of the test plate were measured and are shown in Table 4.

Example 2

A clear coating was prepared in the component proportions shown in Table 3, in the same manner as in Example 1. With this clear coating, a test plate was obtained in the same manner as in Example 1.

Example 3

A clear coating was prepared in the component proportions shown in Table 3, in the same manner as in Example 1.

On the same steel plate (coated with a cationic electrocoating), as used in Example 1 was coated, by air spraying, the solid color base coating prepared in (3-2) of Reference Example 3, followed by setting for 3 minutes. Thereon was coated the above prepared clear coating by a wet-on-wet coating method, followed by setting for 10 minutes. The resulting plate was baked at 140° C. for 20 minutes to obtain a test plate. The clear film thickness and film properties of the test plate were measured and are shown in Table 4.

Example 4

A clear coating was prepared in the component proportions shown in Table 3, in the same manner as in Example 1.

On the same steel plate (coated with a cationic electrocoating) as used in Example 1 was coated the metallic base coating prepared in (3-1-2) of Reference Example 3, in the same manner as in Example 3. The above prepared clear coating was coated thereon in the same manner as in Example 3, followed by baking, to obtain a test plate. The clear film thickness and film properties of the test plate were measured and are shown in Table 4.

Examples 5–6 and Comparative Examples 1–6

Clear coatings were prepared in the component proportions shown in Table 3, in the same manner as in Example 1. With these clear coatings, test plates were obtained in the same manner as Example 1.

Comparative Example 7

A clear coating was prepared in the same manner as in Example 2 except that acetic acid (pKa=4.76) was used in place of dodecylbenzenesulfonic acid, and subjected to storage stability test.

Comparative Example 8

A clear coating was prepared in the same manner as in Example 1 except that phthalic acid was used in place of dodecylbenzenesulfonic acid, and subjected to storage stability test.

Evaluations of film properties were made as follows.

1) Appearance (visually observed)

When a film had excellent appearance, the appearance was rated as ⊙. When a film had poor appearance, the appearance was rated as X.

2) Acid resistance $H_2SO_4$ (40 vol. %) was dropped on a film. After the film was allowed to stand at 50° C. for 5 hours, the film surface was wiped and observed. When the film surface gave no trace, the acid resistance of the film was rated as ⊙. When the film surface gave trace(s), the acid resistance of the film was rated as X.

3) Solvent resistance

A film was rubbed with a xylol-impregnated gauze 50 times forward and backward and then observed. When the surface gave no trace, the solvent resistance of the film was rated as ⊙. When the surface gave slight trace(s), the solvent resistance of the film was rated as O. When the surface gave distinct traces(s), the solvent resistance of the film was rated as X.

4) Water resistance

A film was dipped in hot water of 50° C. for 48 hours and then observed. When the film showed no change, the water resistance of the film was rated as ⊙. When the film showed slight hazing, the water resistance of the film was rated as O.

When the film showed striking hazing and blistering, the water resistance of the film was rated as X.

5) Weatherability

A film was subjected to 3,000-hour testing using a sunshine weatherometer and then measured for retention (%) of gloss. The weatherability of the film was expressed by the retention (%) of gloss.

6) Storage stability

A coating composition was subjected to viscosity adjustment. The resulting coating was stored at 40° C. for 10 days and measured for viscosity using Ford Cup

4. The storage stability of the coating composition was expressed by the days in which the coating prepared therefrom showed a viscosity increase of from the initial viscosity (30 seconds at 25° C.) to 50 seconds at 25° C.

Reference Example 5

Using the raw materials shown in Table 5, there were produced carboxylic acid group- and hydroxyl group-containing acrylic copolymers ($a_2$-1) to ($a_2$-8) each having a solids content of about 50%, using the same apparatus and manner as in Reference Example 1.

TABLE 3

| Formulation | Example | | | | | | Comparative Example | | | | | | | |
|---|---|---|---|---|---|---|---|---|---|---|---|---|---|---|
| | 1 | 2 | 3 | 4 | 5 | 6 | 1 | 2 | 3 | 4 | 5 | 6 | 7 | 8 |
| Acrylic copolymer ($a_1$) | ($a_1$-1) 72 | ($a_1$-2) 48 | ($a_1$-3) 86 | ($a_1$-4) 80 | ($a_1$-2) 48 | $a_1$-1) 72 | ($a_1$-5) 72 | ($a_1$-1) 72 | ($a_1$-6) 225 | ($a_1$-7) 35 | ($a_1$-1) 72 | ($a_1$-1) 72 | ($a_1$-2) 48 | ($a_1$-1) 72 |
| Acrylic copolymer (b) | (b-1) 30 | (b-2) 22 | (b-3) 80 | (b-1) 24 | (b-4) 60 | (b-1) 30 | (b-1) 30 | (b-5) 50 | (b-6) 18 | (b-7) 110 | (b-1) 30 | (b-1) 30 | (b-2) 22 | (b-1) 30 |
| Monobasic acid (c) | | | | | | | | | | | | | | |
| Dodecylbenzenesulfonic acid | 0.5 | 1.6 | 1.7 | — | 0.02 | 1.0 | 0.5 | 1.0 | 3.6 | 0.7 | 0 | 3.2 | 1.6 (acetic acid) | 0.5 (phthalic acid) |
| p-Toluenesulfonic acid | — | — | — | 0.2 | — | 0.5 | — | — | — | — | — | — | | |
| Acid group/ epoxy group (equivalent ratio) | 1/1 | 1/1 | 0.8/1 | 1/0.8 | 1/1 | 1/1 | 1/1 | 1/1 | 1/1 | 1/1 | 1/1 | 1/1 | 1/1 | 1/1 |
| Amount of (c) added per 100 parts of solids of ($a_1$) and (b) | 0.98 | 4.57 | 2.05 | 0.38 | 0.04 | 2.94 | 0.98 | 1.64 | 2.96 | 0.97 | 0 | 6.27 | 4.57 | 0.98 |

TABLE 4

| Evaluated properties | Example | | | | | | Comparative Example | | | | | | |
|---|---|---|---|---|---|---|---|---|---|---|---|---|---|
| | 1 | 2 | 3 | 4 | 5 | 6 | 1 | 2 | 3 | 5 | 6 | 7 | 8 |
| Clear film thickness (μ) | 30 | 28 | 30 | 29 | 31 | 30 | 30 | 29 | 31 | 28 | 29 | | |
| Appearance (visually observed) 1) | ⊚ | ⊚ | ⊚ | ⊚ | ⊚ | ⊚ | X | ⊚ | X | ⊚ | ⊚ | | |
| Gloss (60°) | 100 | 95 | 99 | 98 | 99 | 100 | 87 | 94 | 89 | 100 | 100 | | |
| Acid resistance 2) | ⊚ | ⊚ | ⊚ | ⊚ | ⊚ | ⊚ | ⊚ | ⊚ | ⊚ | ⊚ | ⊚ | ⊚ | |
| Solvent resistance 3) | ⊚ | ○ | ○ | ⊚ | ○ | ⊚ | X | X | X | ⊚ | ⊚ | | |
| Water resistance 4) | ⊚ | ⊚ | ○ | ⊚ | ○ | ⊚ | X | ⊚ | ⊚ | ⊚ | X | | |
| Weatherability 5) | 93 | 90 | 92 | 89 | 92 | 93 | 80 | 88 | 82 | 93 | 93 | | |
| Storage stability 6) | 25 | 45 | 40 | 18 | 14 | 50 | 23 | 30 | 20 | 6 | 13 | 5 | 7 |

The clear coating composition shown in Comparative Example 4 contained a precipitate therein. It had poor stability and therfore was not subjected to subsequent testing.

[Production of acrylic copolymers ($a_2$-1) to ($a_2$-8)]

TABLE 5

| Raw materials | Acrylic copolymer ($a_2$) | | | | | | | |
|---|---|---|---|---|---|---|---|---|
| | ($a_2$-1) | ($a_2$-2) | ($a_2$-3) | ($a_2$-4) | ($a_2$-5) | ($a_2$-6) | ($a_2$-7) | ($a_2$-8) |
| Methyl methacrylate | 5 | | 10 | | | | 5 | |
| n-Butyl methacrylate | 35 | 28 | 41 | | 54 | 40 | 30 | 35 |
| Isobutyl methacrylate | 20 | 20 | | 57 | | 24 | 40 | 10 |
| 2-Ethylhexyl acrylate | 20 | | 30 | 30 | 20 | | | |
| Lauryl methacrylate | | 20 | | | | 20 | 16 | 20 |
| Styrene | 5 | 5 | 5 | | 5 | 5 | | 5 |
| Methacrylic acid | | | | 8 | 6 | | | |
| Acrylic acid | 10 | 9 | 12 | | | 10 | 3 | 20 |
| 2-Hydroxyethyl acrylate | | 8 | | | | | | |
| 2-Hydroxyethyl methacrylate | 5 | 10 | 2 | 5 | 5 | 1 | 6 | 10 |
| N,N'-Azobisisobutyronitrile (polymerization initiator) | 3 | 4 | 4 | 1 | 3.5 | 4 | 3.7 | 2 |
| n-Dodecylmercaptan (chain transfer agent) | | | | 0.5 | | 2 | | |
| Acid value (of solid) | 78 | 70 | 93.5 | 52 | 117 | 78 | 20.4 | 156 |
| Hydroxyl value (of solid) | 21.6 | 81.8 | 8.6 | 21.6 | 21.6 | 4.3 | 25.9 | 43.2 |
| Glass transition temp. (°) | 22.3 | 9.2 | 11.2 | 4.8 | 30.0 | 13.4 | 19.7 | 18.6 |
| Number-average molecular weight | 6000 | 5500 | 5800 | 17000 | 4900 | 3000 | 5500 | 8000 |

15

[Preparation of base coating]

Reference Example 6

(Preparation of metallic base coating)

The following components were formulated in the following proportions and mixed using a stirrer to obtain a base coating composition.

| | |
|---|---|
| Acrylic copolymer ($a_2$-4) produced in Reference Example 5 | 107 parts |
| Acrylic copolymer (b-1) produced in Reference Example 2 | 30 parts |
| Alpaste 7160N | 10.3 parts |

The base coating composition was diluted with the following mixed solvent to a viscosity of 13 seconds at 25° C. (Ford Cup #4) to obtain a metallic base coating.

| | |
|---|---|
| Ethyl acetate | 15 parts |
| Toluene | 40 parts |
| Solvesso #100 | 35 parts |
| Cellosolve acetate | 10 parts |

Example 7

The acrylic copolymer ($a_2$-1), the acrylic copolymer (b-1), dodecylbenzenesulfonic acid (as a specific monobasic acid) and UVAN 20SE-6 (as an amino resin) were formulated in the proportions shown in Table 6 and then subjected to the procedure shown in Reference Example 4 to prepare a clear coating.

A cationic electrocoating was coated on a steel plate for automobile body and baked. Thereon was coated, by air spraying, the metallic base coating prepared in (3-1-1) of Reference Example 3, followed by setting for 3 minutes. Thereon was coated the above prepared clear coating by a wet-on-wet coating method, followed by setting for 10 minutes.

The resulting plate was baked at 140° C. for 20 minutes to obtain a test plate. The clear film thickness and film properties of the test plate were measured and are shown in Table 7.

Example 8

A clear coating was prepared in the component proportions shown in Table 6, in the same manner as in Example 7. With this clear coating, a test plate was obtained in the same manner as in Example 7.

Example 9

A clear coating was prepared in the component proportions shown in Table 6, in the same manner as in Example 7.

On the same steel plate (coated with a cationic electrocoating), as used in Example 7 was coated, by air spraying, the solid color base coating prepared in (3-2) of Reference Example 3, followed by setting for 3 minutes. Thereon was coated the above prepared clear coating by a wet-on-wet coating method, followed by setting for 10 minutes.

The resulting plate was baked at 140° C. for 20 minutes to obtain a test plate. The clear film thickness and film properties of the test plate were measured and are shown in Table 7.

Example 10

A clear coating was prepared in the component proportions shown in Table 6, in the same manner as in Example 7.

On the same steel plate (coated with a cationic electrocoating) as used in Example 7 was coated the metallic base coating prepared in Reference Example 6, in the same manner as in Example 9. The above prepared clear coating was coated thereon in the same manner as in Example 9, followed by baking, to obtain a test plate. The clear film thickness and film properties of the test plate were measured and are shown in Table 7.

Examples 11–12 and Comparative Examples 9–15

Clear coatings were prepared in the component proportions shown in Table 6, in the same manner as in Example 7. With these clear coatings, test plates were obtained in the same manner as Example 7.

TABLE 6

| Formulation | Example 7 | Example 8 | Example 9 | Example 10 | Example 11 | Example 12 | Comparative Example 9 | Comparative Example 10 | Comparative Example 11 | Comparative Example 12 | Comparative Example 13 | Comparative Example 14 | Comparative Example 15 |
|---|---|---|---|---|---|---|---|---|---|---|---|---|---|
| Acrylic copolymer ($a_2$) | ($a_2$-1) 72 | ($a_2$-2) 80 | ($a_2$-3) 60 | ($a_2$-4) 107 | ($a_2$-2) 64 | ($a_2$-5) 72 | ($a_2$-1) 72 | ($a_2$-1) 72 | ($a_2$-1) 72 | ($a_2$-6) 72 | ($a_2$-7) 225 | ($a_2$-8) 35 | ($a_2$-3) 60 |
| Acrylic copolymer (b) | (b-1) 30 | (b-2) 22 | (b-3) 80 | (b-1) 30 | (b-4) 60 | (b-1) 24 | (b-1) 30 | (b-1) 30 | (b-1) 30 | (b-1) 30 | (b-5) 50 | (b-6) 18 | (b-7) 110 |
| Monobasic acid (c) | | | | | | | | | | | | | |
| Dodecylbenzenesulfonic acid | 0.5 | 2.3 | — | 0.34 | 0.02 | 1.0 | — | 3.2 | 0.5 | 0.5 | 1.5 | 1.0 | 0.7 |
| p-Toluenesulfonic acid | — | — | 1.4 | — | — | 0.4 | — | — | — | — | — | — | — |
| Amino resin (d) UVAN 20SE-60 | 8.5 | 18.7 | 3.5 | 5.7 | 15.5 | 5.6 | 8.5 | 8.5 | 25.5 | 8.5 | 11.5 | 3.1 | 14.0 |
| Acid group/epoxy group (equivalent ratio) | 1/1 | 1/1 | 1/1 | 1/1 | 0.8/1 | 1/0.8 | 1/1 | 1/1 | 1/1 | 1/1 | 1/1 | 1/1 | 1/1 |
| Amount of (c) added per 100 parts of solids of ($a_2$) and (b) | 0.98 | 4.51 | 2.00 | 0.50 | 0.03 | 2.92 | 0 | 6.27 | 0.98 | 0.98 | 1.09 | 3.77 | 0.82 |
| Amount of (d) added per 100 parts of solids of ($a_2$) and (b) | 10.0 | 22.0 | 3.0 | 5.0 | 15.0 | 7.0 | 10.0 | 10.0 | 30.0 | 10.0 | 5.0 | 7.0 | 9.9 |

The resulting plate was baked at 140° C. for 20 minutes to obtain a test plate. The clear film thickness and

TABLE 7

| Evaluated properties | Example 7 | Example 8 | Example 9 | Example 10 | Example 11 | Example 12 | Comparative Example 9 | Comparative Example 10 | Comparative Example 11 | Comparative Example 12 | Comparative Example 13 | Comparative Example 15 |
|---|---|---|---|---|---|---|---|---|---|---|---|---|
| Clear film thickness (μ) | 30 | 28 | 30 | 29 | 31 | 30 | 28 | 29 | 30 | 30 | 29 | 31 |
| Appearance (visually observed) 1) | ◎ | ◎ | ◎ | ◎ | ◎ | ◎ | ◎ | ◎ | ◎ | X | ◎ | ◎ |

TABLE 7-continued

| | Example | | | | | | Comparative Example | | | | | |
|---|---|---|---|---|---|---|---|---|---|---|---|---|
| Evaluated properties | 7 | 8 | 9 | 10 | 11 | 12 | 9 | 10 | 11 | 12 | 13 | 15 |
| Gloss (60°) | 100 | 95 | 99 | 98 | 99 | 100 | 100 | 100 | 100 | 87 | 94 | 96 |
| Acid resistance 2) | ⊚ | ⊚ | ⊚ | ⊚ | ⊚ | ⊚ | ⊚ | ⊚ | X | ⊚ | ⊚ | ⊚ |
| Solvent resistance 3) | ⊚ | ⊚ | ⊚ | ○ | ○ | ○ | ⊚ | ⊚ | ⊚ | X | X | X |
| Water resistance 4) | ⊚ | ⊚ | ⊚ | ○ | ○ | ○ | ⊚ | X | ⊚ | X | X | X |
| Weatherability 5) | 93 | 90 | 92 | 89 | 92 | 93 | 93 | 93 | 92 | 80 | 88 | 82 |
| Storage stability 6) | 26 | 42 | 35 | 20 | 13 | 40 | 7 | 44 | 28 | 26 | 28 | 23 |

The clear coating composition shown in Comparative Example 14 contained a precipitate therein. It had poor stability and therefore was not subjected to subsequent testing.

Example 13

The acrylic copolymer ($a_1$-1), the acrylic copolymer (b-1), dodecylbenzenesulfonic acid (as a specific monobasic acid) and benzyltriphenylphosphonium chloride (as a quaternary phosphonium salt) were formulated in the proportions shown in Table 8 and then subjected to the procedure shown in Reference Example 4 to prepare a clear coating.

A cationic electrocoating was coated on a steel plate for automobile body and baked. Thereon was coated, by air spraying, the metallic base coating prepared in (3-1-1) of Reference Example 3, followed by setting for 3 minutes. Thereon was coated the above prepared clear coating by a wet-on-wet coating method, followed by setting for 10 minutes.

The resulting plate was baked at 140° C. for 20 minutes to obtain a test plate. The clear film thickness and film properties of the test plate were measured and are shown in Table 9.

Example 14

A clear coating was prepared in the component proportions shown in Table 8, in the same manner as in Example 13. With this clear coating, a test plate was obtained in the same manner as in Example 13.

Example 15

A clear coating was prepared in the component proportions shown in Table 8, in the same manner as in Example 13.

On the same steel plate (coated with a cationic electrocoating), as used in Example 13 was coated, by air spraying, the solid color base coating prepared in (3-2) of Reference Example 3, followed by setting for 3 minutes. Thereon was coated the above prepared clear coating by a wet-on-wet coating method, followed by setting for 10 minutes.

The resulting plate was baked at 140° C. for 20 minutes to obtain a test plate. The clear film thickness and film properties of the test plate were measured and are shown in Table 9.

Example 16

A clear coating was prepared in the component proportions shown in Table 8, in the same manner as in Example 13.

On the same steel plate (coated with a cationic electrocoating) as used in Example 13 was coated the metallic base coating prepared in (3-1-2) of Reference Example 3, in the same manner as in Example 15. The above prepared clear coating was coated thereon in the same manner as in Example 15, followed by baking, to obtain a test plate. The clear film thickness and film properties of the test plate were measured and are shown in Table 9.

Examples 17–19 and Comparative Examples 16–21

Clear coatings were prepared in the component proportions shown in Table 8, in the same manner as in Example 13. With these clear coatings, test plates were obtained in the same manner as Example 13. The film properties of each test plate were measured and are shown in Table 9.

TABLE 8

| | Example | | | | | | | Comparative Example | | | | | |
|---|---|---|---|---|---|---|---|---|---|---|---|---|---|
| Formulation | 13 | 14 | 15 | 16 | 17 | 18 | 19 | 16 | 17 | 18 | 19 | 20 | 21 |
| Acrylic copolymer ($a_1$) | ($a_1$-1) | ($a_1$-2) | ($a_1$-3) | ($a_1$-4) | ($a_1$-5) | ($a_1$-1) | ($a_1$-1) | ($a_1$-1) | ($a_1$-1) | ($a_1$-5) | ($a_1$-1) | ($a_1$-6) | ($a_1$-7) |
| | 72 | 48 | 86 | 80 | 48 | 72 | 72 | 72 | 72 | 72 | 72 | 225 | 35 |
| Acrylic copolymer (b) | (b-1) | (b-2) | (b-3) | (b-1) | (b-4) | (b-1) | (b-1) | (b-1) | (b-1) | (b-1) | (b-5) | (b-6) | (b-7) |
| | 30 | 22 | 80 | 24 | 60 | 30 | 30 | 30 | 30 | 30 | 50 | 18 | 110 |
| Monobasic acid (c) | | | | | | | | | | | | | |
| Dodecylbenzene-sulfonic acid | 0.5 | 1.6 | 1.7 | — | 0.02 | 1.0 | 0.5 | 0 | 3.2 | 0.5 | 1.0 | 3.6 | 0.7 |
| p-Toluenesulfonic acid | — | — | — | 0.2 | — | 0.5 | — | — | — | — | — | — | — |
| Quaternary phosphonium salt (e) | | | | | | | | | | | | | |
| Benzyltriphenyl-phosphonium chloride | 1.0 | 0.5 | 0.5 | 0.02 | 0.05 | 1.5 | 0.5 | 0.5 | 0.5 | 0.5 | 0.5 | 1.0 | 0.5 |
| Acid group/epoxy group (equivalent ratio) | 1/1 | 1/1 | 0.8/1 | 1/0.8 | 1/1 | 1/1 | 1/1 | 1/1 | 1/1 | 1/1 | 1/1 | 1/1 | 1/1 |
| Amount of (c) added per 100 parts of solids of ($a_1$) and (b) | 0.98 | 4.51 | 2.05 | 0.38 | 0.04 | 2.94 | 0.98 | 0 | 6.27 | 0.98 | 1.64 | 2.96 | 0.97 |
| Amount of (e) added per 100 parts of solids of ($a_1$) and (b) | 1.96 | 1.43 | 0.60 | 0.04 | 0.10 | 2.94 | 0.98 | 0.98 | 0.98 | 0.98 | 0.82 | 0.82 | 0.98 |

TABLE 9

| Evaluated properties | Example | | | | | | | Comparative Example | | | | |
|---|---|---|---|---|---|---|---|---|---|---|---|---|
| | 13 | 14 | 15 | 16 | 17 | 18 | 19 | 16 | 17 | 18 | 20 | 21 |
| Clear film thickness (μ) | 30 | 28 | 30 | 29 | 31 | 30 | 30 | 28 | 29 | 30 | 29 | 31 |
| Appearance (visually observed) 1) | ⊚ | ⊚ | ⊚ | ⊚ | ⊚ | ⊚ | ⊚ | ⊚ | ⊚ | X | ⊚ | X |
| Gloss (60°) | 100 | 95 | 99 | 98 | 99 | 100 | 100 | 100 | 100 | 87 | 94 | 89 |
| Acid resistance 2) | ⊚ | ⊚ | ⊚ | ⊚ | ⊚ | ⊚ | ⊚ | ⊚ | ⊚ | ⊚ | ⊚ | ⊚ |
| Solvent resistance 3) | ⊚ | ○ | ○ | ⊚ | ○ | ⊚ | ⊚ | ⊚ | ⊚ | X | X | X |
| Water resistance 4) | ⊚ | ○ | ⊚ | ⊚ | ○ | ⊚ | ⊚ | ⊚ | X | X | ⊚ | ⊚ |
| Weatherability 5) | 93 | 90 | 92 | 89 | 92 | 93 | 93 | 93 | 93 | 80 | 83 | 82 |
| Storage stability 6) | 24 | 40 | 33 | 18 | 12 | 38 | 25 | 6 | 40 | 24 | 29 | 38 |

The clear coating composition shown in Comparative Example 19 contained a precipitate therein. It had poor stability and therefore was not subjected to subsequent testing.

Examples 20–22 and Comparative Examples 22–23

Coatings were prepared in the same manner as in Example 13 except that the amount of benzyltriphenylphosphonium chloride was changed as shown in Table 10. Test plates were obtained in the same manner as in Example 13 except that the baking at 120° C. was conducted for 8 minutes. The film properties of each test plate were measured and are shown in Table 10.

TABLE 10

| Formulation | Example | | | Comparative Example | |
|---|---|---|---|---|---|
| | 20 | 21 | 22 | 22 | 23 |
| Acrylic copolymer (a₁) | (a₁-1) 72 | (a₁-1) 72 | (a₁-1) 72 | (a₁-1) 72 | (a₁-1) 72 |
| Acrylic copolymer (b) | (b-1) 30 | (b-1) 30 | (b-1) 30 | (b-1) 30 | (b-1) 30 |
| Monobasic acid (c) Dodecylbenzene-sulfonic acid | 0.5 | 0.5 | 0.5 | 0.5 | 0.5 |
| Quaternary phosphonium salt (e) Benzyltriphenyl-phosphonium chloride | 0.02 | 0.5 | 1.3 | — | 2.0 |
| Amount of (e) added per 100 parts of solids of (a₁) and (b) | 0.04 | 0.98 | 2.55 | 0 | 3.92 |
| Property evaluations | | | | | |
| Water resistance | ○ | ⊚ | ⊚ | X | ⊚ |
| Solvent resistance | ○ | ⊚ | ⊚ | X | ⊚ |
| Storage stability | 27 | 25 | 22 | 29 | 4 |

Example 23

The acrylic copolymer (a₂-1) produced in Reference Example 5, the acrylic copolymer (b-1) produced in Reference Example 2, dodecylbenzenesulfonic acid (as a specific monobasic acid), UVAN 20SE-60 (as an amino resin) and benzyltriphenylphosphonium chloride (as a quaternary phosphonium salt) were formulated in the proportions shown in Table 11 and then subjected to the procedure shown in Reference Example 4 to prepare a clear coating.

A cationic electrocoating was coated on a steel plate for an automobile body and baked. Thereon was coated, by air spraying, the metallic base coating prepared in (3-1-1) of Reference Example 3, followed by setting for 3 minutes. Thereon was coated the above prepared clear coating by a wet-on-wet coating method, followed by setting for 10 minutes.

The resulting plate was baked at 140° C. for 20 minutes to obtain a test plate. The clear film thickness and film properties of the test plate were measured and are shown in Table 12.

Example 24

A clear coating was prepared in the component proportions shown in Table 11, in the same manner as in Example 23. With this clear coating, a test plate was obtained in the same manner as in Example 23.

Example 25

A clear coating was prepared in the component proportions shown in Table 11, in the same manner as in Example 23.

On the same steel plate (coated with a cationic electrocoating), as used in Example 23 was coated, by air spraying, the solid color base coating prepared in (3-2) of Reference Example 3, followed by setting for 3 minutes. Thereon was coated the above prepared clear coating by a wet-on-wet coating method, followed by setting for 10 minutes.

The resulting plate was baked at 140° C. for 20 minutes to obtain a test plate. The clear film thickness and film properties of the test plate were measured and are shown in Table 12.

Example 26

A clear coating was prepared in the component proportions shown in Table 11, in the same manner as in Example 23.

On the same steel plate (coated with a cationic electrocoating) as used in Example 23 was coated the solid color base coating prepared in (3-2) of Reference Example 3, by air spraying, followed by setting for 3 minutes. Thereon was coated the above prepared clear coating by a wet-on-wet coating method, followed by setting for 10 minutes. The resulting plate was baked at 140° C. for 20 minutes to obtain a test plate. The clear film thickness and film properties of the test plate were measured and are shown in Table 12.

Example 27

A clear coating was prepared in the component proportions shown in Table 11, in the same manner as in Example 23.

On the same steel plate (coated with a cationic electrocoating) as used in Example 23 was coated the metallic base coating prepared in (3-1-2) of Reference Example 3, in the same manner as in Example 25. The above prepared clear coating was coated thereon in the same manner as in Example 25, followed by baking, to obtain a test plate. The clear film thickness and film properties of the test plate were measured and are shown in Table 12.

Example 28 and Comparative Examples 24–30

Clear coatings were prepared in the component proportions shown in Table 11, in the same manner as in Example 23. With these clear coatings, test plates were obtained in the same manner as Example 23.

TABLE 11

Example

TABLE 11-continued

| Formulation | 23 | 24 | 25 | 26 | 27 | 28 |
|---|---|---|---|---|---|---|
| Acrylic copolymer (a₂) | (a₂-1) 72 | (a₂-2) 80 | (a₂-3) 60 | (a₂-4) 107 | (a₂-2) 64 | (a₂-5) 72 |
| Acrylic copolymer (b) | (b-1) 30 | (b-2) 22 | (b-3) 80 | (b-1) 30 | (b-4) 60 | (b-1) 24 |
| Monobasic acid (c) | | | | | | |
| Dodecylbenzenesulfonic acid | 0.5 | 2.3 | — | 0.34 | 0.02 | 1.0 |
| p-Toluenesulfonic acid | — | — | 1.4 | — | — | 0.4 |
| Amino resin (d) UVAN 20SE-60 | 8.5 | 18.7 | 3.5 | 5.7 | 15.5 | 5.6 |
| Quaternary phosphonium salt (e) Benzyltriphenylphosphonium chloride | 1.0 | 0.03 | 0.8 | 1.8 | 0.4 | 0.1 |
| Acid group/epoxy group (equivalent ratio) | 1/1 | 1/1 | 1/1 | 1/1 | 0.8/1 | 1/0.8 |
| Amount of (c) added per 100 parts of solids of (a₂) and (b) | 0.98 | 4.51 | 2.00 | 0.50 | 0.03 | 2.92 |
| Amount of (d) added per 100 parts of solids of (a₂) and (b) | 10.0 | 22.0 | 3.0 | 5.0 | 15.0 | 7.0 |
| Amount of (e) added per 100 parts of solids of (a₂) and (b) | 1.96 | 0.06 | 1.14 | 2.63 | 0.65 | 0.20 |

| | Comparative Example | | | | | |
|---|---|---|---|---|---|---|
| Formulation | 24 | 25 | 26 | 27 | 28 | 29 | 30 |
| Acrylic copolymer (a₂) | (a₂-1) 72 | (a₂-1) 72 | (a₂-1) 72 | (a₂-6) 72 | (a₂-7) 225 | (a₂-8) 35 | (a₂-3) 60 |
| Acrylic copolymer (b) | (b-1) 30 | (b-1) 30 | (b-1) 30 | (b-1) 30 | (b-5) 50 | (b-6) 18 | (b-7) 110 |
| Monobasic acid (c) | | | | | | | |
| Dodecylbenzenesulfonic acid | — | 3.2 | 0.5 | 0.5 | 1.5 | 1.0 | 0.7 |
| p-Toluenesulfonic acid | — | — | — | — | — | — | — |
| Amino resin (d) UVAN 20SE-60 | 8.5 | 8.5 | 25.5 | 8.5 | 11.5 | 3.1 | 14.0 |
| Quaternary phosphonium salt (e) Benzyltriphenylphosphonium chloride | 0.5 | 0.5 | 0.5 | 0.5 | 1.4 | 0.3 | 1.0 |
| Acid group/epoxy group (equivalent ratio) | 1/1 | 1/1 | 1/1 | 1/1 | 1/1 | 1/1 | 1/1 |
| Amount of (c) added per 100 parts of solids of (a₂) and (b) | 0 | 6.27 | 0.98 | 0.98 | 1.09 | 3.77 | 0.82 |
| Amount of (d) added per 100 parts of solids of (a₂) and (b) | 10.0 | 10.0 | 30.0 | 10.0 | 5.0 | 7.0 | 9.9 |
| Amount of (e) added per 100 parts of solids of (a₂) and (b) | 0.98 | 0.98 | 0.98 | 0.98 | 1.02 | 1.13 | 1.18 |

TABLE 12

| | Example | | | | | | Comparative Example | | | | | |
|---|---|---|---|---|---|---|---|---|---|---|---|---|
| Evaluated properties | 23 | 24 | 25 | 26 | 27 | 28 | 24 | 25 | 26 | 27 | 28 | 30 |
| Clear film thickness (μ) | 30 | 28 | 30 | 29 | 31 | 30 | 28 | 29 | 30 | 30 | 29 | 31 |
| Appearance (visually observed) 1) | ⊙ | ⊙ | ⊙ | ⊙ | ⊙ | ⊙ | ⊙ | ⊙ | ⊙ | X | ⊙ | ⊙ |
| Gloss (60°) | 100 | 95 | 99 | 98 | 99 | 100 | 100 | 100 | 100 | 87 | 94 | 96 |
| Acid resistance 2) | ⊙ | ⊙ | ⊙ | ⊙ | ⊙ | ⊙ | ⊙ | ⊙ | X | ⊙ | ⊙ | ⊙ |
| Solvent resistance 3) | ⊙ | ⊙ | ⊙ | ○ | ○ | ○ | ⊙ | ⊙ | ⊙ | X | X | X |
| Water resistance 4) | ⊙ | ⊙ | ⊙ | ○ | ○ | ○ | ⊙ | X | ⊙ | X | X | X |
| Weatherability 5) | 93 | 90 | 92 | 89 | 92 | 93 | 93 | 93 | 92 | 80 | 83 | 82 |
| Storage stability 6) | 24 | 40 | 33 | 18 | 12 | 34 | 7 | 42 | 26 | 24 | 28 | 23 |

The clear coating composition shown in Comparative Example 29 contained a precipitate therein. It had poor stability and therefore was not subjected to subsequent testing.

Examples 29–31 and Comparative Examples 31–32

Coatings were prepared in the same manner as in Example 23 except that the amount of benzyltriphenylphosphonium chloride was changed as shown in Table 13. Test plates were obtained in the same manner as in Example 23 except that the baking at 120° C. was conducted for 8 minutes. The film properties of each test plate were measured and are shown in Table 14.

TABLE 13

| | Example | | | Comparative Example | |
|---|---|---|---|---|---|
| Formulation | 29 | 30 | 31 | 31 | 32 |
| Acrylic copolymer (a₂) | (a₂-1) 72 | (a₂-1) 72 | (a₂-1) 72 | (a₂-1) 72 | (a₂-1) 72 |

TABLE 13-continued

| | Example | | | Comparative Example | |
|---|---|---|---|---|---|
| Formulation | 29 | 30 | 31 | 31 | 32 |
| Acrylic copolymer (b) | (b-1) 30 | (b-1) 30 | (b-1) 30 | (b-1) 30 | (b-1) 30 |
| Monobasic acid (c) Dodecylbenzenesulfonic acid | 0.5 | 0.5 | 0.5 | 0.5 | 0.5 |
| Amino resin (d) UVAN 20SE-60 | 8.5 | 8.5 | 8.5 | 8.5 | 8.5 |
| Quaternary phosphonium salt (e) Benzyltriphenylphosphonium chloride | 0.02 | 0.5 | 1.3 | — | 2.0 |
| Amount of (e) added | 0.04 | 0.98 | 2.55 | 0 | 3.92 |

TABLE 13-continued

| | Example | | | Comparative Example | |
|---|---|---|---|---|---|
| Formulation | 29 | 30 | 31 | 31 | 32 |
| per 100 parts of solids of ($a_2$) and (b) | | | | | |

TABLE 14

| | Example | | | Comparative Example | |
|---|---|---|---|---|---|
| Evaluated properties | 29 | 30 | 31 | 31 | 32 |
| Water resistance | ○ | ⊚ | ⊚ | X | ⊚ |
| Solvent resistance | ○ | ⊚ | ⊚ | X | ⊚ |
| Storage stability | 25 | 24 | 20 | 26 | 5 |

We claim:

1. A resin composition for a thermosetting coating, which comprises
   ($a_1$) an acrylic copolymer containing a carboxylic acid group-containing monomer and another monomer copolymerizable therewith, said acrylic copolymer having an acid value of 30–150 mgKOH/g,
   (b) an acrylic copolymer containing an epoxy group-containing monomer and another monomer copolymerizable therewith, said acrylic copolymer having an epoxy equivalent of 200–1,000 g/eq, and
   (c) a monobasic acid having a dissociation constant (pKa) of 3 or less selected from the group consisting of p-toluene-sulfonic acid, dodecylbenzenesulfonic acid, dinonylnaphthalenesulfonic acid, methanesulfonic acid, trichloroacetic acid, thioacetic acid, acidic phosphoric acid esters, hydrochloric acid and nitric acid, and wherein the equivalent ratio of the carboxylic acid groups of ($a_1$) and the epoxy groups of (b) is 1:0.5 to 0.5:1 and the amount of (c) is 0.01–5 parts by weight per 100 parts by weight of the total of ($a_1$) and (b).

2. A resin composition according to claim 1, which comprises
   ($a_2$) an acrylic copolymer containing a carboxylic acid group-containing monomer, a hydroxyl group-containing monomer and another monomer copolymerizable therewith, said acrylic copolymer having an acid value of 30–150 mgKOH/g and a hydroxyl value of 5–100 mgKOH/g,
   (b) an acrylic copolymer containing an epoxy group-containing monomer and another monomer copolymerizable therewith, said acrylic copolymer having an epoxy equivalent of 200–1,000 g/eq,
   (c) a monobasic acid having a dissociation constant (pKa) of 3 or less selected from the group consisting of p-toluene-sulfonic acid, dodecylbenzenesulfonic acid, dinonylnapthalenesulfonic acid, methanesulfonic acid, trichloroacetic acid, thioacetic acid, acidic phosphoric acid esters, hydrochloric acid, and nitric acid, and
   (d) an amino resin,
and wherein the equivalent ratio of the carboxylic acid groups of ($a_2$) and the epoxy groups of (b) is 1:0.5 to 0.5:1, the amount of (c) is 0.01–5 parts by weight per 100 parts by weight of the total of ($a_2$) and (b), and the amount of (d) is 1–25 parts by weight per 100 parts by weight of the total of ($a_2$) and (b).

3. A resin composition according to claim 1, which further comprises
   (e) a quaternary phosphonium salt in an amount of 0.01–3 parts by weight per 100 parts by weight of the total of ($a_1$) and (b).

4. A resin composition according to claim 2, which further comprises
   (e) a quaternary phosphonium salt in an amount of 0.01–3 parts by weight per 100 parts by weight of the total of ($a_2$) and (b).

5. A resin composition according to claim 1, wherein the glass transition temperature of the acrylic copolymer ($a_1$) is 50° C. or lower.

6. A resin composition according to claim 2, wherein the glass transition temperature of the acrylic copolymer ($a_2$) is 50° C. or lower.

7. A resin composition according to claim 1, wherein the glass transition temperature of the acrylic copolymer (b) is 50° C. or lower.

8. A resin composition according to claim 1, wherein the carboxylic acid group-containing monomer is at least one compound selected from the group consisting of acrylic acid, methacrylic acid, maleic acid, maleic anhydride, itaconic acid and esters thereof.

9. A resin composition according to claim 1, wherein the carboxylic acid group-containing monomer is acrylic acid, methacrylic acid or their mixture.

10. A resin composition according to claim 1, wherein the another monomer copolymerizable with the carboxylic acid group-containing monomer is at least one compound selected from esters between $C_{1-18}$ aliphatic alcohol, alicyclic alcohol or aromatic alcohol and acrylic acid or methacrylic acid, styrene and derivatives thereof, acrylonitrile, acrylamides, methacrylamides and $C_{2-20}$ vinyl compounds.

11. A resin composition according to claim 1, wherein the epoxy group-containing monomer is glycidyl methacrylate, glycidyl acrylate, methylglycidyl methacrylate, methylglycidyl acrylate or allyl glycidyl ether.

12. A resin composition according to claim 1, wherein the other monomer copolymerizable with the epoxy group-containing monomer is at least one compound selected from esters between $C_{1-18}$ aliphatic alcohol, alicyclic alcohol or aromatic alcohol and acrylic acid or methacrylic acid, styrene and derivatives thereof, acrylonitrile, acrylamides, methacrylamides and $C_{2-20}$ vinyl compounds.

13. A resin composition according to claim 1, wherein the number-average molecular weight of the acrylic copolymer ($a_1$) is 3,500–20,000 and the number-average molecular weight of the acrylic copolymer (b) is 500–5,000.

14. A resin composition according to claim 2, wherein the number-average molecular weight of the acrylic copolymer ($a_2$) is 3,500–20,000 and the number-average molecular weight of the acrylic copolymer (b) is 500–5,000.

15. A resin composition according to claim 1, wherein the number-average molecular weight of the acrylic copolymer ($a_1$) is 5,200–20,000 and the number-average molecular weight of the acrylic copolymer (b) is 500–5,000.

16. A resin composition according to claim 2, wherein the number-average molecular weight of the acrylic copolymer ($a_2$) is 5,200–20,000 and the number-average molecular weight of the acrylic copolymer (b) is 500–5,000.

17. A resin composition according to claim 1, wherein the organic sulfonic acids are p-toluenesulfonic acid, dodecylbenzenesulfonic acid, dinonylnaphthalenesulfonic acid and methanesulfonic acid.

18. A resin composition according to claim 2, wherein the amino resin (d) is a resin synthesized from formaldehyde and at least one compound selected from melamine, urea, benzoguanamine and glycoluril and has a methylol group partially or wholly alkyl-etherified with an alcohol.

19. A resin composition according to claim 4, wherein the amino resin (d) is a resin synthesized from formaldehyde and at least one compound selected from melamine, urea, benzoguanamine and glycoluril and has a methylol group partially or wholly alkyl-etherified with an alcohol.

20. A resin composition according to claim 3, wherein the quaternary phosphonium salt (e) is a monomer selected from the group consisting of methyltrioctylphosphonium dimethylphosphate, methyltributylphosphonium dimethylphosphate, methyltriphenylphosphonium dimethylphosphate, tetrabutylphosphonium acetate, benzyltriphenylphosphonium acetate, tetrabutylphosphonium bromide, tetrabutylphosphonium chloride, tetrabutylphosphonium iodide, tetraphenylphosphonium bromide, tetraphenylphosphonium chloride, tetraphenyiphosphonium iodide, benzyltriphenylphosphonium bromide, benzyltriphenylphosphonium chloride, benzyltriphenylphosphonium iodide, tetrabutylphosphonium hydroxide, tetraphenylphosphonium tetraphenylborate and p-styryldiphenylphosphonium bromide; or a polymer of p-styryldiphenylphosphonium bromide; or a copolymer of p-styryldiphenylphosphonium bromide with other monomer copolymerizable therewith.

21. A resin composition according to claim 4, wherein the quaternary phosphoniuum salt (e) is a monomer selected from the group consisting of methyltrioctylphosphonium dimethylphosphate, methyltributylphosphonium dimethylphosphate, methyltriphenylphosphonium dimethylphosphate, tetrabutylphosphonium acetate, benzyltriphenylphosphonium acetate, tetrabutylphosphonium bromide, tetrabutylphosphonium chloride, tetrabutylphosphonium iodide, tetraphenylphosphonium bromide, tetraphenylphosphonium chloride, tetraphenylphosphonium iodide, benzyltriphenylphosphonium bromide, benzyltriphosphonium chloride, benzyltriphenylphosphonium iodide, tetrabutylphosphonium hydroxide, tetraphenylphosphonium tetraphenylborate and p-styryldiphenylphosphonium bromide; or a polymer of said monomer; or a copolymer of said monomer with other monomer copolymerizable therewith.

22. A one-pack type thermosetting coating comprising a resin composition according to claim 4 and a solvent.

23. A thermosetting coating according to claim 22, wherein the solvent is at least one compound selected from the group consisting of aliphatic hydrocarbons, aromatic hydrocarbons, esters, ketones and alcohols.

24. A thermosetting coating according to claim 23, wherein the aliphatic hydrocarbons are hexane and heptane.

25. A thermosetting coating according to claim 23, wherein the aromatic hydrocarbons are toluene, xylene and petroleum fractions.

26. A thermosetting coating according to claim 23, wherein the esters are ethyl acetate, butyl acetate, ethylene glycol diacetate and 2-ethoxyethyl acetate.

27. A thermosetting coating according to claim 23, wherein the ketones are acetone and methyl isobutyl ketone.

28. A thermosetting coating according to claim 23, wherein the alcohols are methanol and butanol.

29. A coating method which comprises coating and baking of a thermosetting coating of claim 22.

30. A coating method according to claim 29, which comprises coating, on a substrate, a base coating containing a color pigment and a metallic pigment, coating thereon a thermosetting coating of claim 22 as a clear top coating by a wet-on-wet coating method, and simultaneously conducting baking.

31. A one-pack type thermosetting coating comprising a resin composition according to claim 1 and a solvent.

32. A one-pack type thermosetting coating comprising a resin composition according to claim 2 and a solvent.

33. A one-pack type thermosetting coating comprising a resin composition according to claim 3 and a solvent.

* * * * *